(12) United States Patent
DiFrancesco et al.

(10) Patent No.: US 6,172,705 B1
(45) Date of Patent: *Jan. 9, 2001

(54) METHOD AND APPARATUS FOR A FILM SCANNER INTERFACE

(75) Inventors: David DiFrancesco, San Francisco; Matthew T. Martin, Point Reyes; James R. Burgess, Richmond, all of CA (US)

(73) Assignee: Pixar, Richmond, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/710,112

(22) Filed: Sep. 12, 1996

(51) Int. Cl.[7] ..................................... H04N 9/11
(52) U.S. Cl. .................. 348/97; 395/650; 395/425; 348/459; 382/167
(58) Field of Search ................... 348/97, 441, 571, 348/708, 717, 720, 721; 364/705.05, 136; 395/561, 670, 800.01, 672, 675

(56) References Cited

U.S. PATENT DOCUMENTS

| 4,205,337 | 5/1980 | Millward . |
| 4,255,764 | 3/1981 | Howe . |
| 4,330,793 | 5/1982 | Stemme et al. . |
| 4,729,015 | 3/1988 | Wagensonner . |
| 5,237,686 | * 8/1993 | Asano et al. ............... 395/650 |
| 5,249,056 | 9/1993 | Foung et al. . |
| 5,406,070 | * 4/1995 | Edgar et al. ............... 348/362 |
| 5,771,109 | * 6/1998 | DiFrancesco ............... 358/507 |
| 5,815,202 | * 9/1998 | DiFrancesco ............... 348/97 |
| 5,926,226 | * 7/1999 | Proctor et al. ............. 348/422 |

OTHER PUBLICATIONS

DiFrancesco, David, Laser Based Color film Recorder system with GaAS Microlaser, SPIE Proceedings, vol. 1079, Jan. 17–20, 1989.

Imagica Product Information on High–Resolution Digital film Scanner IDS4000.

* cited by examiner

Primary Examiner—Chris S. Kelley
Assistant Examiner—Shawn S. An
(74) Attorney, Agent, or Firm—The Hecker Law Group

(57) ABSTRACT

A digital film scanner interface obtains digital image data produced by projecting a motion picture film frame onto a sensor. The image data is transferred from the sensor to a Digital Signal Processor ("DSP") block. The DSP block processes the image data to, for example, minify, magnify, enhance colors, or correct for errors in the image data. The DSP block comprises four DSPs. One of the DSPs receives the image data from the sensor and controls the flow of the image data to the other three DSPs. The processing tasks can then be distributed to the DSPs based on availability. Alternatively, the digital signal processing tasks can be allocated such that each DSP processes one color component of image data. After the image data is processed, it is transferred over a bus to a long term storage device.

4 Claims, 7 Drawing Sheets

METHOD AND APPARATUS FOR A FILM SCANNER INTERFACE

BACKGROUND OF THE INVENTION

1. Field of the Invention

This invention relates to the field of image scanners, and more specifically to the field of motion picture digitizer interfaces.

2. Background Art

Film scanners have been developed to digitize films for storage and processing in a digital form. Storing motion picture images in a digital form has many advantages over storing motion picture images using film. These advantages include the fact that digital images can be readily duplicated with no loss of image quality, digital images can be readily enhanced by computers, digital films can be stored indefinitely, and digital films can be distributed electronically.

Typically a digital film scanner digitizes a film frame using a light source which exposes a film frame and projects an image. The projected image passes through a lens and onto a sensor. The sensor then converts the image into data for storage. Generally a film frame image is exposed by several colored light sources. For example, an image may be first exposed by a red light source, then a green light source, then a blue light source. Some digital film scanners use a sensor as large or larger than the projected image. Other digital film scanners use a sensor smaller than the projected image.

A line-array sensor is a sensor having a width smaller than the width of projected film frame images. This requires the projected images to be moved across the line-array sensor to expose the entire projected image to the sensor. One way to scan a film frame using a line-array sensor is to move a lens so as to move the projected image across the sensor. The height of the projected image at the sensor is smaller than or equal to the height of the sensor. Therefore, to expose the line-array sensor to the entire projected image requires only that the projected image move perpendicular to the line-array sensor. The lens moves along an axis parallel to the plane of the film gate, and perpendicular to the direction of film transport. Moving the lens in this manner moves the projected image across the vertical face of the sensor, and thereby exposes the sensor to the entire projected image, one line at a time. This type of scanning sub-system is described in more detail in the co-pending application "METHOD AND APPARATUS FOR SCANNING AN IMAGE USING A MOVING LENS SYSTEM," David DiFrancesco, Ser. No. 08/664,266, filed Jun. 11, 1996, and assigned to the assignee of this application.

A variety of motion generating means may be used to move the lens in a moving lens scanner. For example, a cam connected to the lens via a spring mounted base can be used to move the lens. In one type of cam driven scanner a motor rotates the cam, causing the lens to make a full cycle of movement with each complete rotation of the cam. The horizontal scanning movement of the lens allows the sensor to only have to cover the generally shorter vertical axis of the film frame. The lens may expose the sensor to a full frame in each direction of its motion. Scanning images during both directions of the lens movement maximizes efficiency by avoiding having the sensor wait for the lens to return. Alternatively, an image may be scanned as the lens moves in one direction only, with a wait period following each scan for the lens to return to the start position. The scanning speed is generally limited by the speed of the sensor. To obtain full resolution from a sensor requires that the sensor be exposed to a threshold number of photons.

An alternative to using a moving lens is to use a moving mirror system to scan projected images across the sensor, as is known by those of ordinary skill in the art. An example of a scanner that uses a moving mirror system to scan projected images across a sensor is described in U.S. Pat. No. 4,330,793, entitled "ELECTRONIC SCANNING OF SUPER-8 FILMS FOR REPRODUCTION ON A T.V. VIEWING UNIT," the disclosure of which is hereby incorporated by reference. The tilting mirror system is very similar to that used in galvanometric systems, although slight structural modifications may be necessary with regard to the magnetic system thereof. Such systems provide the precise controllability of deflection required by the scanner.

Image scanner references include:

In U.S. Pat. No. 5,249,056 Foung et al. describe an apparatus for generating video signals from a photographic image previously recorded on film (a cine video system) which includes a film transport mechanism, an image projector, a video pickup system which receives the image and generates a video signal which represents it, and an output circuit which produces a resultant output video signal. The system performs rudimentary image processing techniques including black and white contrast enhancement. The system may process the data as the data is read out of frame memory. The system may then display this data on a video monitor at a rate of up to 30 film frames per second.

In U.S. Pat. No. 4,205,337 Millward describes an apparatus for producing motion picture film by scanning the film horizontally at a scanning station while transporting the film continuously past the scanning station with means for accommodating different film sizes, transport speeds, and film format by changing the frequency of the horizontal scan while performing a predetermined number of horizontal line scans in respect of each frame of the film, The line scan signals are stored in a memory, and the memory is read to produce a plurality of television picture fields at a different frequency from that at which scanning takes place. The frequency at which the television picture fields are generated is higher than that at which the line scan is effected so that the two are made temporally compatible by repeating certain television fields in order to "fill-in" for spare time.

In U.S. Pat. No. 4,729,015 Wagensonner describes a system for making positive copies from diapositives. Diapositives are copied on negative photosensitive paper in an apparatus wherein the positive is electronically scanned, line-by-line, and the density signals thereby obtained are electronically inverted prior to influencing the beam of a CRT or laser which is used to reproduce the image of the positive on paper, either line-by-line or point-by-point. The inversion of signals renders it possible to scan the high-transmissivity portions of the positives with a narrow beam, i.e., with a high degree of resolution.

Typically, motion picture film digitizers digitize a series of film frames, store that data on a magnetic tape or a collection of hard drives, and then later perform image processing operations. Digital signal processing operations that often must be performed by motion picture film digitizers include: filtering, color correction, minification, and magnification. This two step process is used because the interface between the projected image sensor and the processor is too slow to perform the required image processing of the high resolution color images as they are digitized. Thus, a higher speed interface and image processor are needed to perform the complex image processing required for high resolution color motion picture film digitization.

SUMMARY OF THE INVENTION

The present invention is directed to a digital film scanner interface. The interface obtains digital image data produced by projecting a motion picture film frame onto a sensor. The image data is transferred from the sensor to a Digital Signal Processor ("DSP") block. The DSP block processes the image data to, for example, minify, magnify, enhance colors, or correct for errors in the image data. After the image data is processed, it is transferred over a bus to a long term storage device.

The DSP block comprises four DSPs. Commands can originate from a user interface. The commands are converted by the film scanner interface into an internal representation and executed by the DSP block. One of the DSPs receives the image data from the sensor and controls the flow of the image data to the other three DSPs. The processing tasks are modular to afford flexibility in how the tasks are distributed. The processing tasks can be distributed to the DSPs based on availability. Alternatively, the digital signal processing tasks can be allocated such that each DSP processes one color component of image data. A single task can be performed on two different physical DSPs using dedicated channel connections between the DSPs. This architecture can provide image processing speeds that exceed the speed that a sensor provides image data.

DETAILED DESCRIPTION OF THE INVENTION

The present invention is directed to a film scanner interface. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

Figure 1:
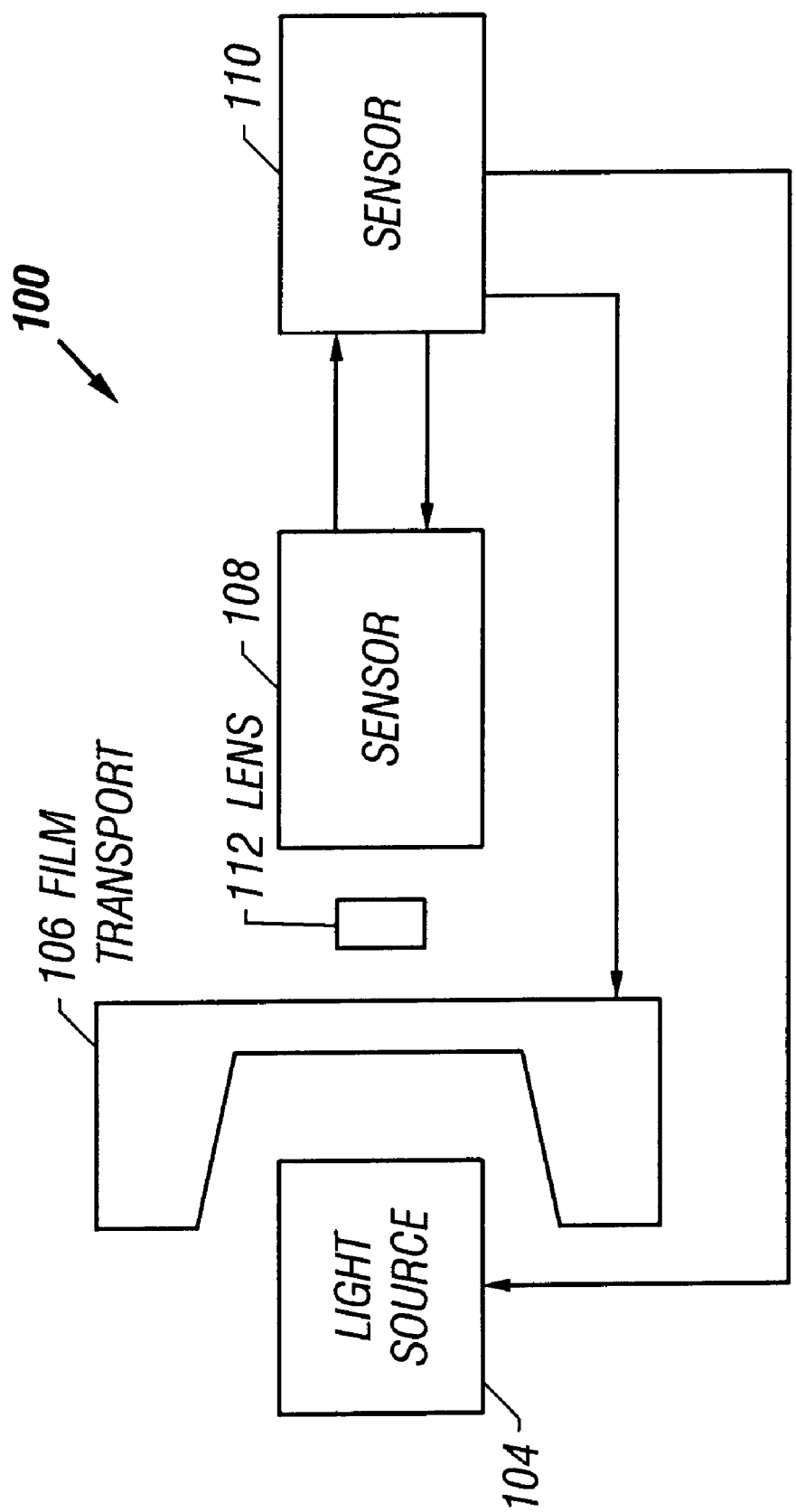
FIG. 1 illustrates a block diagram of a film scanning apparatus.

FIG. 1 illustrates a system level overview of a film scanner of the present invention. Element 104 is a light source. In one embodiment, element 104 is an integrating sphere with four strobe or flash lamps. One flash lamp has a red filter attached to it, one flash lamp has a green filter attached to it, and two flash lamps have blue filters attached to them. This type of light source is described in more detail in the co-pending application "METHOD AND APPARATUS FOR DIGITIZING FILMS USING A STROBOSCOPIC SCANNING SYSTEM," David DiFrancesco, Ser. No. 08/651,164, filed May 17, 1996, and assigned to the assignee of this application, the disclosure of which is hereby incorporated by reference. Other light sources may be used including continuous wave xenon or halogen lamps, as is well known by those of ordinary skill in the art. Element 106 represents a film transport. For example, a "BELL & HOWELL"™ brand film shuttle mechanism as may be used in the motion picture industry. Element 108 represents a light sensor. In one embodiment, element 108 is a "PHOTOMETRICS"™ CCD camera which contains a CCD array (not shown).

Alternative sensors may also be used including non-CCD sensors, or a CCD line array. Element 110 represents the film scanner's interface and control systems, as described in detail below.

During operation of film scanning apparatus 100, light source 104 projects an image of a film frame provided by film transport 106. The projected image exposes sensor 108, and the image data is transferred from sensor 108 to film scanner interface 110 for processing and storage. In one embodiment sensor 108 is at least as large as the projected image, so that the entire projected image can be digitized simultaneously. Alternatively a line-array sensor may be used for sensor 108, and the projected image may be moved across sensor 108 to expose the entire projected image to the sensor.

In one embodiment, flash lamp light source 104 comprises four flash lamps, a red flash lamp, a green flash lamp, and two blue flash lamps. Two blue flash lamps are used because the blue filters are denser than the green and red filters. For example, in one embodiment about 1% of the energy of the lamp is transmitted through the blue filter, compared to about 10–12% for the red filter, and higher for the green. Thus, the two blue flash lamps are used to transmit a sufficient amount of blue light through the blue filter to avoid having the blue light exposure time be unacceptably longer than the exposure time for the green and red light sources.

Figure 2:
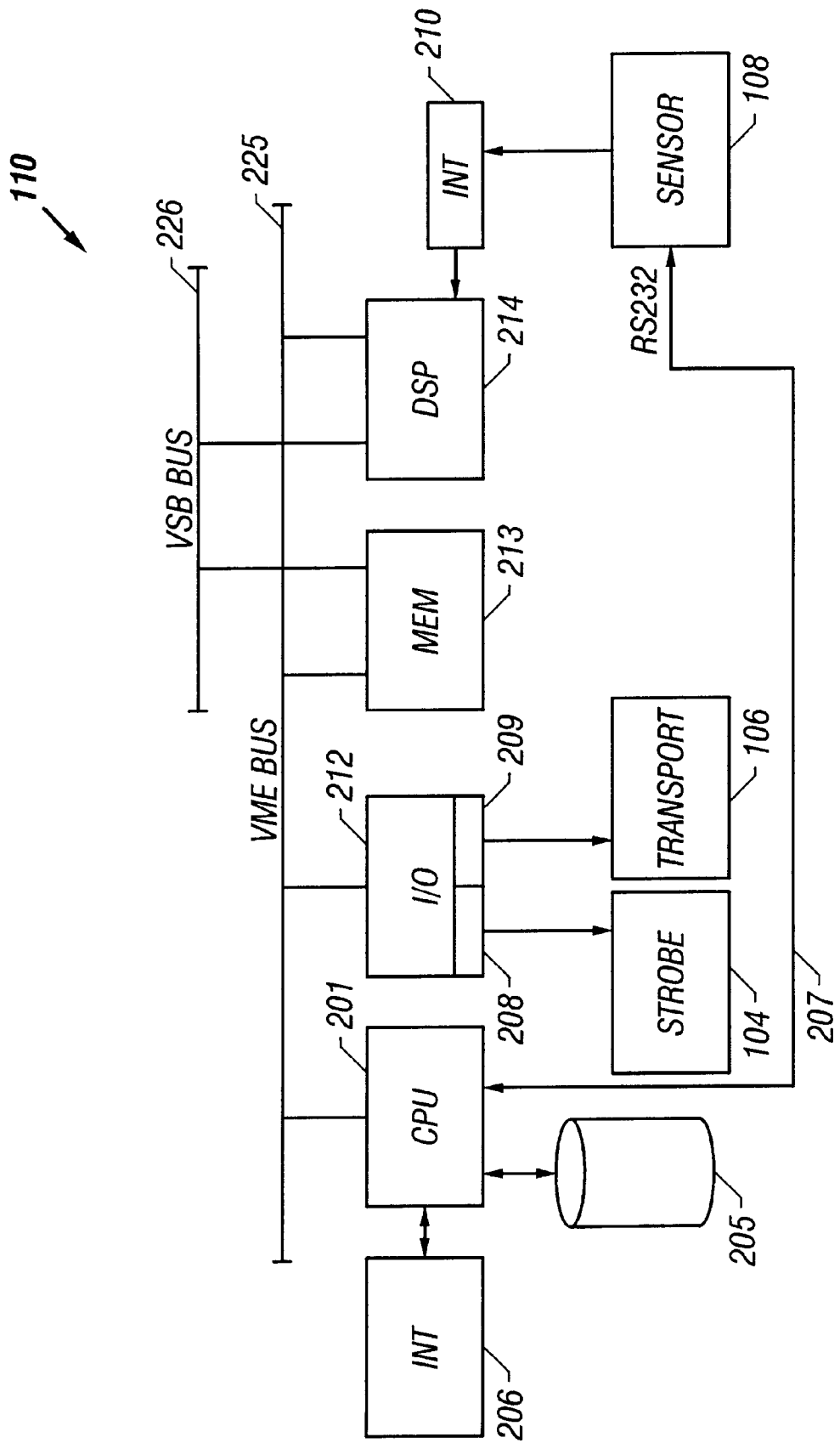
FIG. 2 illustrates a block diagram of a film scanner interface of the present invention.

In one embodiment, controller 208, shown in FIG. 2, sends a pulse to a flash lamp in light source 104. The flash lamp then continues to flash for a predetermined time based on the time required for sensor 108 to saturate as determined in a calibration procedure. A sensor saturates when it obtains a predetermined resolution level of image data. Controller 208 also controls the frequency of the flash lamps. In an alternative embodiment, controller 208 is programmed to deliver a predetermined number of pulses to each flash lamp to trigger the flash lamp to flash, for example, between 1 and 255. A control program executed by controller 208 controls the number of pulses sent to each flash lamp, where the number is determined so as to ensure that the flash lamp provides adequate exposure to sensor 108.

FIG. 2 illustrates a preferred embodiment of the element 110 film scanner interface and control systems. Element 201 is a Central Processing Unit ("CPU") card. In one embodiment, element 201 is a "THEMIS"™ 10 MP CPU card, this is a 6 U size VME bus card. The preferred configuration of the card includes: 32 megabytes memory, a single 75 MHz "SUN"™ "SPARC II"™processor with cache, an SBus video card for display video, and two RS232 ports. One of these RS232 ports is coupled to sensor 108. Element 205 is a storage medium, coupled to CPU card 201. In one embodiment, element 205 is a plurality of hard disk drives coupled to CPU card 201 by a SCSI bus. CPU card 201 is also coupled through interface 206 to a user network, for example, an ethernet connection. CPU card 201 is further coupled to VME bus backplane 225. CPU card 201 is coupled via VME bus 225 to Input/Output (I/O) 212, Memory element 213, and Digital Signal Processor (DSP) block 214.

Element 212 is an I/O card, for example, a "GREEN SPRING"™ VME/IP interface card. "GREEN SPRING"™ VME/IP interface cards provide an interface for up to four Industry Packs (IP) cards to VME bus 225. Element 209 is a controller for film transport 106 and other ancillary devices. Controller 209 controls these devices through an optically isolated relay panel. Element 208 is a light source controller. In this embodiment, element 209 is an IP card, and element 208 is a specifically designed IP sized card to control flash lamps in light source 104. Controller 208 includes registers to store the flash lamp frequency, start pulses, stop pulses, and generate interrupts when the flash lamp exposure is complete. Element 208 is coupled to I/O card 212.

Element 213 is a memory means. In one embodiment, element 213 is a "RAMIX"™ RM-140B Memory card with 64 megabytes of dual-ported memory. Element 214 is a DSP block. In one embodiment DSP block 214 comprises a set of two "SPECTRUM"™ VME DSP carrier boards. Each VME board contains two DSP processors, for example, "TEXAS INSTRUMENTS"™ TMS320C40 DSP block 214 is described in greater detail with respect to FIGS. 4 and 5.

Element 210 is an interface between sensor 108 and DSP block 214. In one embodiment, element 210 is a specially designed interface to attach to a buffered COMM port on the "SPECTRUM"™ VME DSP carrier boards in DSP block 214. The maximum data rate on a buffered COMM port is about 15 megabytes/second (Mb/sec.). The maximum data rate from one embodiment "PHOTOMETRICS"™ CCD camera is 2 Mb/sec. The fact that the COMM port data rate is substantially higher than the CCD data rate will allow the scanner interface system to be used with future faster sensors.

In operation, CPU card 201 is the central controller for the film scanning system. CPU card 201 runs an operating system ("OS"), which in one embodiment is the "SOLARIS"™ OS. CPU card 201 controls the operation of sensor 108 through RS232 port 207. CPU card 201 controls I/O card 212, Memory 213, and DSP block 214 via VME bus 225. Image data is stored in storage medium 205. Interface 206 is used to transfer image data to users.

Memory 213 may be accessed by either VME bus 225 or VSB bus 226. In one embodiment, VSB bus 226 moves processed data out of DSP block 214 to Memory 213. Image data then moves from memory 213 across VME bus 225 to CPU card 201 for final processing and storage in storage medium 205. Memory 213 acts as both a large buffer for image data between DSP block 214 and CPU card 201, and as a fast means for transferring data from DSP block 214. Data rates out of DSP block 214 are about 2 Mb/sec. on VME bus 225 and are about 15 Mb/sec. on VSB bus 226.

To turn on a flash lamp, light source controller 208 sends a pulse to the flash lamp. The green and red light sources each have a dedicated channel connection to light source controller 108, and a third channel connects controller 108 to both of the blue flash lamps. Alternatively, a dedicated channel may be used for each of the blue flash lamps.

Figure 3:
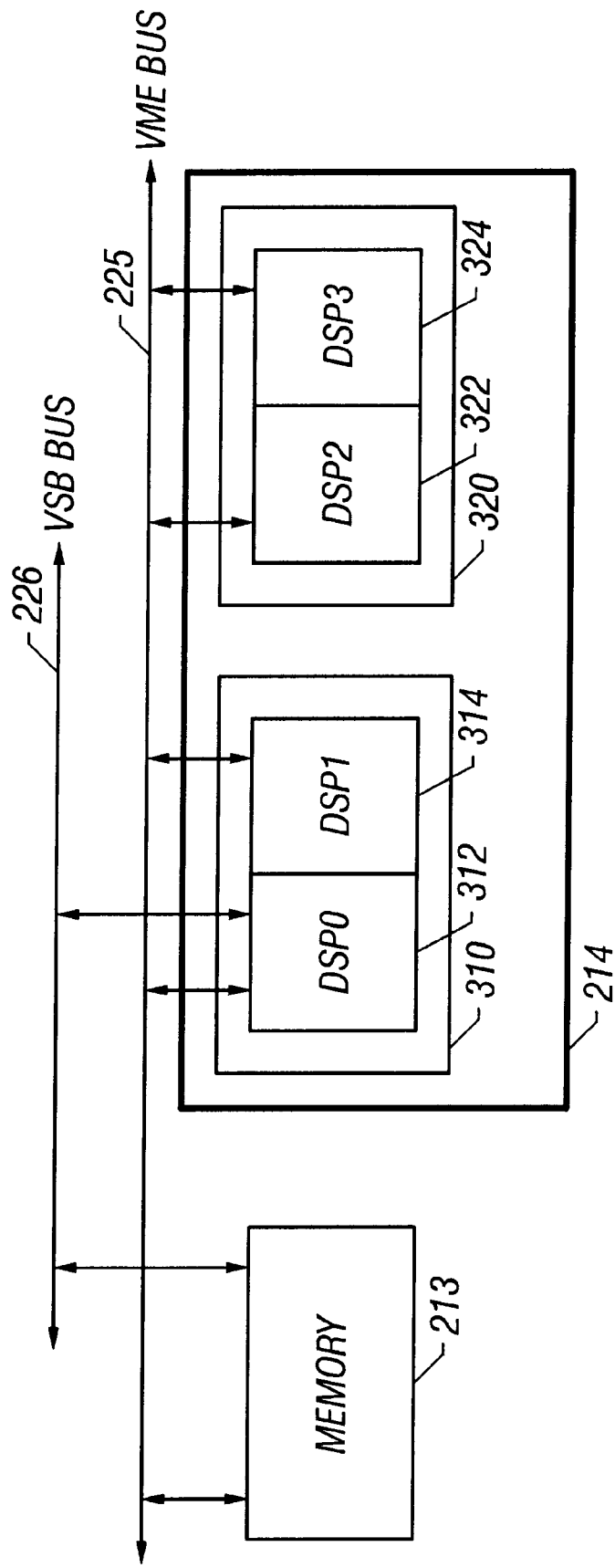
FIG. 3 illustrates a block diagram of the digital signal processor card configuration in one embodiment of the present invention.

FIG. 3 illustrates one embodiment VME carrier board configuration. Elements 310 and 320 are VME carrier boards. VME carrier boards 310 and 320 are components of DSP block 214 shown in FIG. 2. Each carrier board 310 and 320 provides support for four single sized DSP cards or two double-sized DSP cards. Carrier boards 310 and 320 contain COMM ports that connect the four DSP card sites on the board, as well as COMM ports that are routed to the edge of the card to provide connections to other carrier boards or I/O devices. DSP0 312, DSP1 314, DSP2 322, and DSP3 324 are DSP cards plugged into VME carrier boards 310 and 320. DSP0 312 is the only DSP directly coupled to VSB bus 226. DSP0 312, DSP1 314, DSP2 322, and DSP3 324 are all coupled to VME bus 225. The coupling between the DSPs is described in greater detail in FIG. 4.

Figure 4:
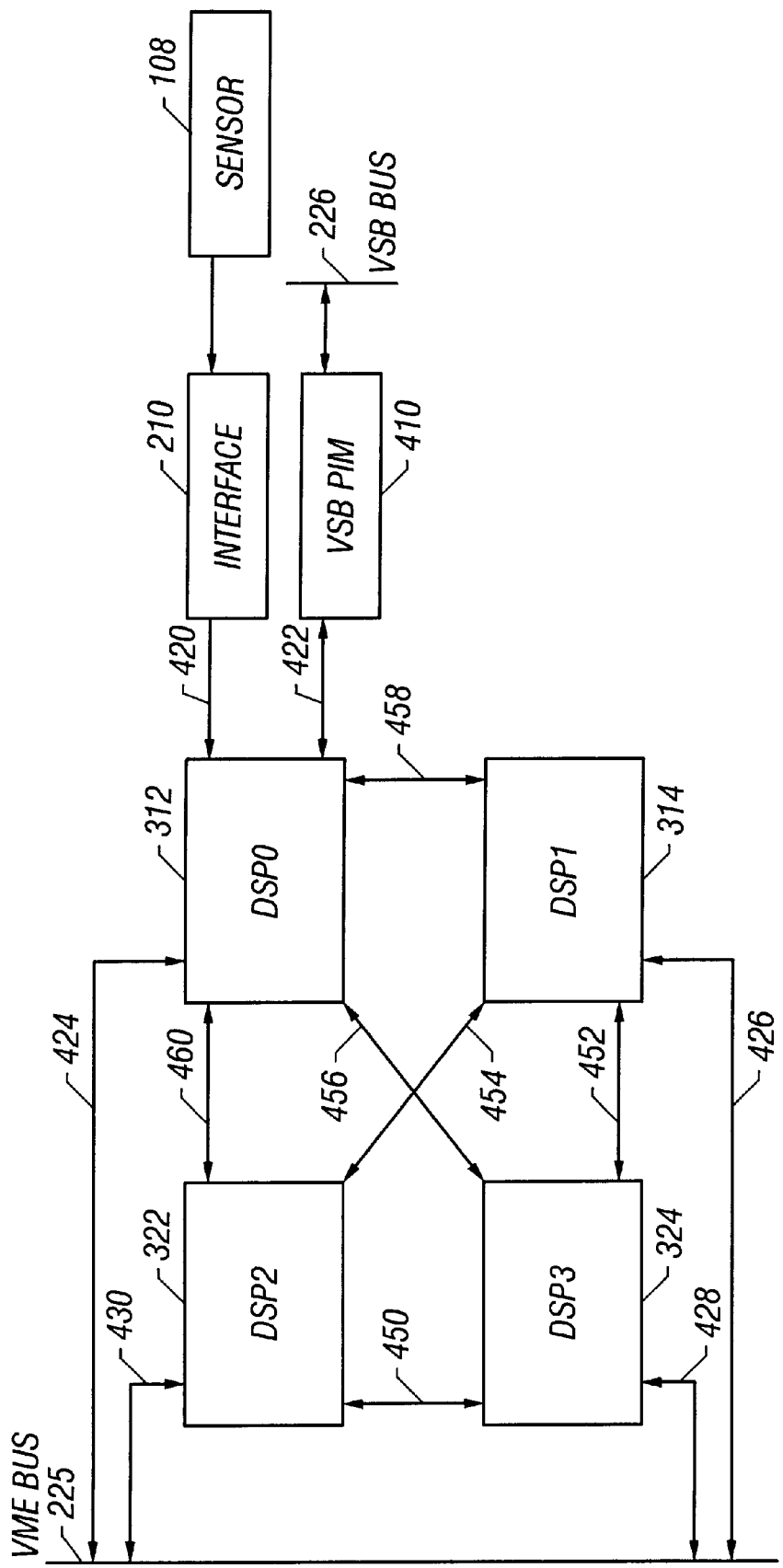
FIG. 4 illustrates a block diagram of the front end and digital signal processor block of the present invention.

FIG. 4 illustrates DSP logical connections in one embodiment of the present invention. The COMM port interconnects between the DSP processors are elements 450, 452, 454, 456, 458 and 460. The four DSPs are arranged in a star network, so that each DSP is directly connected to every other DSP and all the DSPs can communicate together. The COMM port interconnects operate at 20 Mb/sec. for intra-board transfers. Element 420 is a buffered inter-board COMM port interconnect. Element 422 couples DSP0 312 to VSB PIM card 410. VSB PIM card 410 is an interface to VSB bus 226. Elements 424, 426, 428 and 430 are COMM port links which connect each DSP to VME bus 225.

DSP0 312 is the only DSP which has an interface to sensor 108. DSP0 312 is also the only DSP with an interface to VSB bus 226. DSP0 312 is coupled to CPU card 201 via VME bus 225. In one embodiment DSP0 312 is a "TEXAS INSTRUMENTS"™ TMS320C40 with a 50 MHz clock speed, and 12 Megabyte of zero wait state EDRAM. In one embodiment DSP1 314, DSP2 322, and DSP3 324 are "TEXAS INSTRUMENTS"™ TMS320C40 with 40 MHz clock speed and 32 megabyte of one wait state DRAM. In one embodiment the 32 megabytes of memory is enough for one and half frames of image data.

In operation, DSP0 312 manages image data created by sensor 108. DSP0 312 distributes image data among DSP1 314, DSP2 322, and DSP3 324 via the intra-board COMM ports 450, 452, 454, 456, 458 and 460. In this embodiment DSP0 312 is a control DSP, and DSP1 314, DSP2 322, and DSP3 324 are task DSPs. DSP0 312 also communicates with CPU card 201 to provide input for the control of light source 104, sensor 108, and film transport 106. In one embodiment, each DSP processes data created by one of the color component light sources in light source 104. For example, in one embodiment, DSP1 314 processes red data, DSP2 322 processes green data, and DSP3 324 processes blue data. Each DSP0 signals DSP0 312 when it completes processing a group of data. The DSP0 then sends the processed data through the dedicated channel to VSB bus 226 and to CPU card 201 for storage in storage element 205. DSP0 312 controls the transfer of data from each DSP to VSB bus 226. An alternative method, is to divide the image into geometric regions and process the data in groups representing each region. The operation of the DSPs is described in greater detail below.

COMM port links 424, 426, 428, and 430 which link the DSPs to VME bus 225 are used for a variety of functions including: testing the DSPs, loading and executing DSP programs, and generating interrupts. Interface 210 transfers data to DSP0 312 for processing through interconnect 420. Element 422 couples DSP0 312 to VSB PIM card 410.

Figure 6:
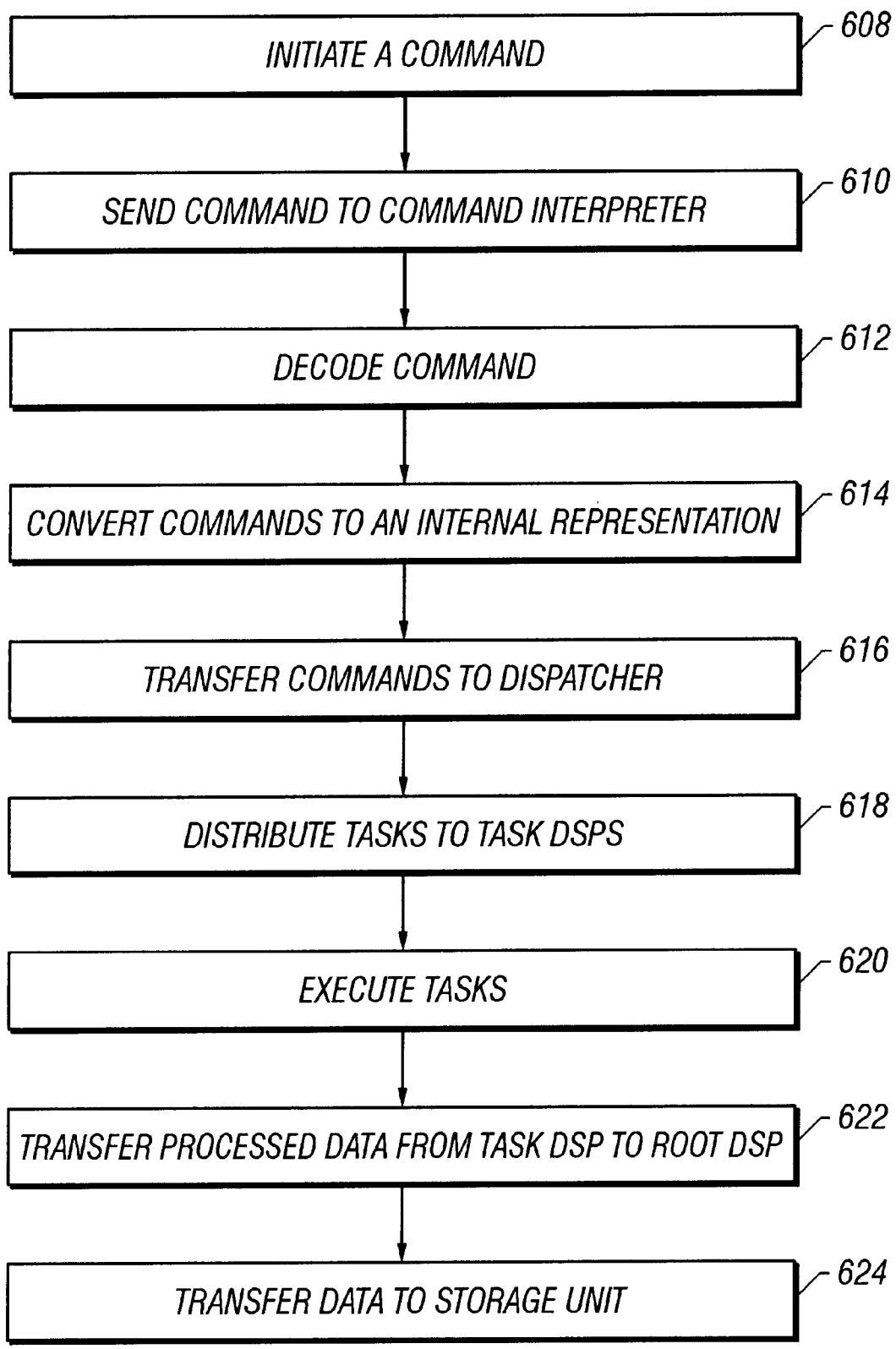
FIG. 6 illustrates a flow chart of the process of executing a digital signal processing command.
Figure 7:
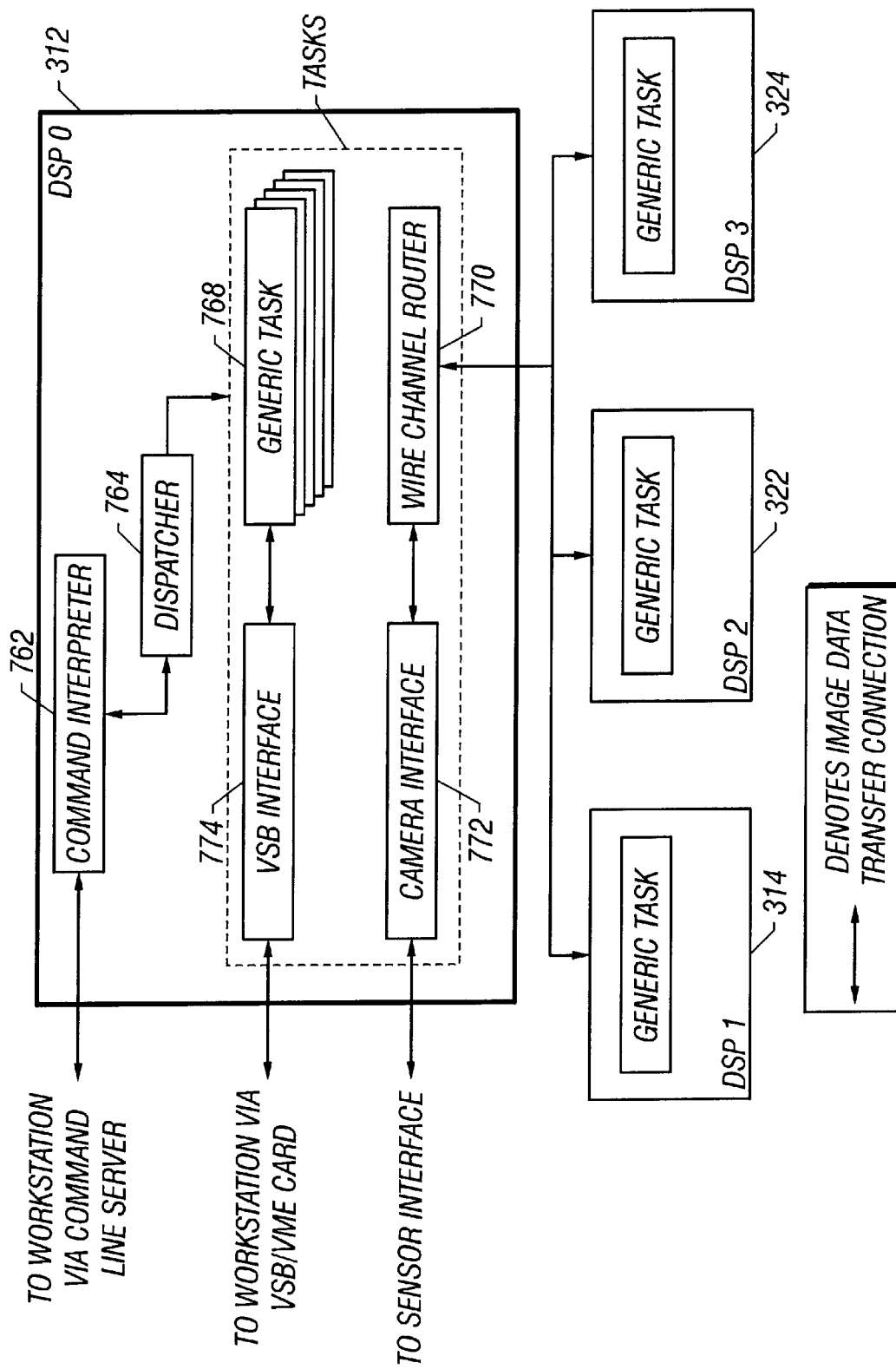
FIG. 7 illustrates a block diagram of the software operations performed by the digital signal processor block.

FIG. 7 illustrates the operation of the DSP block 214 software. The components illustrated in the DSPs in FIG. 7 represent software tasks, in contrast to FIG. 4 which illustrates a block diagram of the DSP hardware. An overview of the process of executing commands is illustrated in FIG. 6. Commands relating to digital signal processing may originate from the user interface task.

The text strings are transferred from the user interface to command interpreter 762 via VME bus 225. Command interpreter 762 parses the text string commands, checks the syntax, and ultimately compiles each command into an internal representation that is readable by dispatcher 764. Command interpreter 762 outputs the internal representation of the commands to a queue to make command interpreter 762 available to process another command or provide status information to CPU 201.

This approach provides a natural way to implement scripting and simplifies debugging of both the user interface and the DSP software. Command interpreter 762 converts general text string commands into DSP driver level code. Using text string commands also allows script files to be written as simple text files to perform frequently used DSP tasks.

Dispatcher 764 removes commands from the queue and runs the appropriate tasks to complete the commands. Each command can comprise more than one task. Dispatcher 764 runs commands by connecting the composite tasks together. The tasks can be executed by the task DSPs 314, 322 and 324, or by the root DSP 312. Dispatcher 764 also coordinates execution of the tasks. Dispatcher 764 connects tasks via channels. A single command may be executed by a single DSP, or by several DSPs working in parallel. Each DSP processor has a dedicated channel connecting it to each of the other DSP processors. These dedicated channels can only accommodate communication between one pair of tasks at a time. Wire channel router 770 is a software function that arbitrates the dedicated channels between the DSPs. Dispatcher 764 monitors the active tasks and along with wire channel router 770 ensures that only one pair of active tasks communicate over a dedicated channel at a time. Dispatcher 764 may place commands in a temporary waiting state when the resources to execute the commands are not available.

The tasks are highly modular. Tasks are generally all similar in that they take image data from an input channel, perform an operation on the image data, and then send the results to the output channel. The task code is independent of which DSP the task is executed on, and is also independent of where the data is received from or sent to. Examples of tasks include minification, sharpening, and image compression. There are some special tasks such as the "camera interface" that do not have an input channel. The "camera interface" task receives image data from sensor 108. Another special task is the "VSB" task. The "VSB" task transfers image data from the DSP block 214 to the CPU 201 via either VME bus 225 or VSB bus 226.

Dispatcher 764 uses a standard method to allocate input and output channels to tasks to allow task pairs to communicate. The modular approach to establishing communication channels allows the same communication code to be used in all of the tasks, thereby simplifying the development of new tasks.

The DSP run-time environment includes a micro-kernel. The microkernel provides inter-task communication channels. The inter-task communication channels provide an abstraction that allows tasks to be on the same or two different physical DSPs without requiring any changes to the tasks. Tasks are run as time-sliced threads.

This modular task based architecture provides the advantage of facilitating the addition of new processing options without modifying existing tasks. Further, the modular nature of the tasks effectively uses the parallel processing capability of the DSP hardware architecture by distributing different tasks to different DSPs for concurrent execution.

Figure 5:
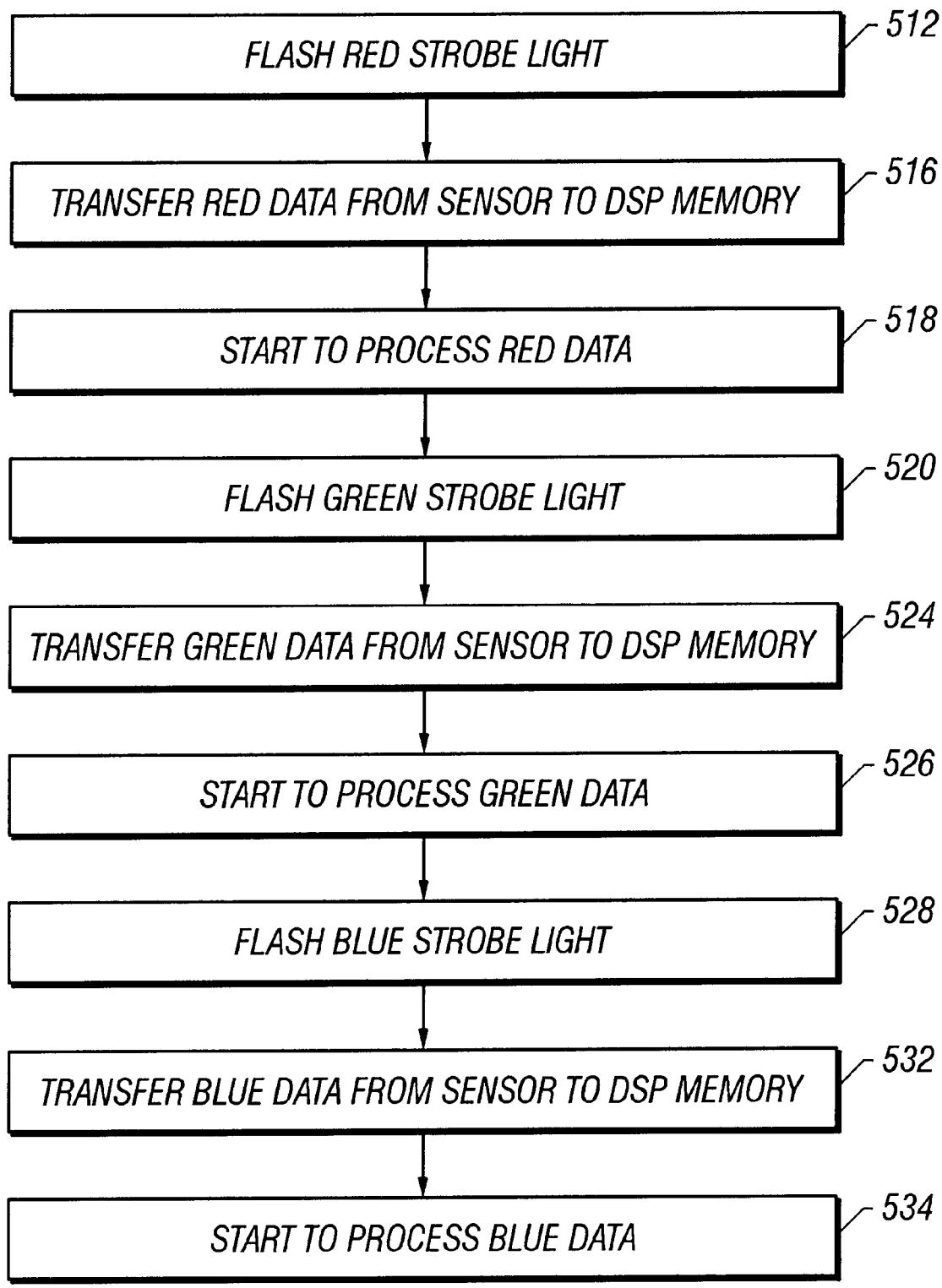
FIG. 5 illustrates a flow chart of the process of digitizing a film frame.

FIG. 5 illustrates at a high level one embodiment of how the film scanner interface obtains and processes image data. In step 512, light source controller 208 signals the red flash lamp in light source 104 to start flashing at the frequency stored in a register in light source controller 208, for example 30 Hz. In one embodiment, all of the flash lamps flash at the same frequency. In an alternative embodiment, the flash lamp frequency of each lamp is independent of the other flash lamps. Each flash of the red flash lamp in one embodiment produces four joules of light. In each sensor exposure cycle, the red flash lamp flashes for a predetermined time. The duration of the flashing cycle is determined by a calibration procedure in which the amount of time required to expose sensor 108 to a predetermined amount of light for a given image is measured. For example, according to one embodiment of the invention a CCD array sensor saturation level is twelve bits logarithmic, on a scale of 0 to 4096. After the exposure period, in step 516 sensor 108 transfers the red image data from the radiation sensitive element in sensor 108 to shift registers in sensor 108. Sensor 108 then transfers the data from the sensor 108 shift registers to interface 210. The data is transferred immediately after each color is finished. The data out of the camera is essentially a raster. Sensor 108 transfers data along a 16 bit wide connection. Control information is transferred along with the image data, including pixel clock, valid line, and valid frame signals. Interface 210 converts the data from the 16 bit wide format in which sensor 108 transfers it, to an 8 bit wide format for transfer to DSP0 312. DSP0 312 distributes the image data to an available DSP or a DSP dedicated to processing that color of data, either DSP1 314, DSP2 322, or DSP3 324. When the selected DSP finishes processing the data, it signals DSP0 312. The data is then transferred via VSB bus 226 to CPU card 201 and ultimately to storage medium 205.

While the red color data is being processed, in step 520 light source controller 208 signals the green flash lamp to begin to flash. In one embodiment, the green flash lamp flashes for a predetermined time. As with the red flash lamp, each flash of the green flash lamp produces four joules of light. In step 526 the green color data is transferred from the radiation sensitive element in sensor 108 to shift registers in sensor 108. The green color data is then transferred to DSP0 312. As with the red data, DSP0 312 distributes the green data to an available DSP or alternatively to a DSP dedicated to processing green data. When the dedicated DSP finishes processing the data, it signals DSP0 312. The data is then transferred via VSB bus 226 to CPU card 201 and ultimately to storage medium 205.

At step 528, while the green color data is being processed, light source controller 208 signals the two blue flash lamps to begin to flash. The blue flash lamps are flashed simultaneously. Each flash of one of the blue flash lamps in this embodiment produces up to four joules of light. After the blue flash lamps flash for a predetermined time required to expose sensor 108, the blue color data is transferred from the radiation sensitive element in sensor 108 to shift registers in sensor 108. In step 532, the blue color data is then transferred to DSP0 312, and distributed for processing as described for the red and green data.

Each cycle of exposing the CCD array with the red, green, and blue color components is a "scan." One embodiment performs three scans, one each for the red, green, and blue component light sources, to digitize the image of each film frame. The duration of each color scan is determined using a calibration procedure which measures the amount of each light component required to saturate sensor 108. In one embodiment sensor 108 is a 2 k×3 k CCD pixel array. Therefore, each scan generates six million pixels of color data. As described above, when the CCD array is fully saturated each pixel comprises twelve bits of information. When the proper amount of light has been delivered, the image data is transferred from sensor 108 to DSP block 214. In one embodiment, the image data is transferred from sensor 108 to DSP0 312 at a rate of two million pixels per second. Thus, it takes three seconds to transfer the color data corresponding to each strobe lamp color from a 2 k×3 k CCD array to DSP0 312.

The following provides a summary of the timing sequence for exposing sensor 108 to each color component light source and transferring the image data from sensor 108 to DSP0 312. The red light source exposes the frame image on sensor 108 for approximately one second. To transfer the red color data from sensor 108 to DSP0 312 takes three seconds. As DSP0 312 receives the red data, it simultaneously transfers the red data to a DSP dedicated to processing red data, at a rate of 20 Mb/sec. After sensor 108 transfers the red data, there is then approximately one second of green light exposure to sensor 108, simultaneous with the DSP processing of the red color data. This is followed by three seconds to transfer the green color data to DSP0 312. After sensor 108 transfers the green data, there is then approximately one second of blue light exposure to sensor 108, followed by three seconds to transfer the blue color data to DSP0 312. Thus, a total of twelve seconds are spent in order to capture and pass all color data from a single film frame to DSP0 312.

DSP block 214 can perform many different image processing operations including filtering, color correction, minification, magnification, correction for sensor defects, and rotation. Minification is a critical application because for many scanner applications the bandwidth of the back-end image processing system will be limited and therefore the per-frame image data size must be reduced to be processed by the back-end system.

As described above in one embodiment, DSP1 314, DSP2 322, and DSP3 324 are each dedicated to processing a particular color of data. An alternative approach, is to use a pipeline approach whereby each DSP performs a process. For example, DSP1 314 minifies the image data, DSP2 322 corrects the color of the image data, and DSP3 324 normalizes the image data. When a color component of image data has been fully processed it is transferred back to DSP0 312. DSP0 312 then transfers it to CPU card 201. Software control of DSP0 312 and CPU card 201 are tightly coupled because of the extensive inter-relationship between the transfer of data to and from DSP0 312 and the control of the light source 104 and sensor 108.

Thus a method and apparatus for a film scanner interface have been described. Although the present invention has been described with respect to certain specific embodiments, it will be clear to those skilled in the art that the inventive features of the present invention are applicable to other embodiments as well, all of which are intended to fall within the scope of the present invention.

We claim:

1. A method of processing digital image sensor data comprising:
    transferring digital image data from a sensor to a control digital signal processor;
    converting commands into an internal representation;
    assigning a task to a temporary wait state if no digital signal processor is available;
    assigning a task to a task digital signal processor;
    transferring digital image data from said control digital signal processor to one of said plurality of task digital signal processors;
    performing tasks transferred to said plurality of task digital signal processors on said plurality of task digital signal processors, said tasks executable by said plurality of task digital signal processors and said control digital processor;
    performing non-transferred tasks on said control digital signal processor;
    transferring digital image data from said task digital signal processors to a storage unit.

2. The method of claim 1 wherein said distributing tasks step further comprises the steps of:
    assigning component commands of some tasks to two digital signal processors;
    coordinating execution of the commands by using communication over a dedicated channel between the two digital signal processors.

3. The method of claim 2 wherein said step of performing tasks comprises executing tasks as time-sliced threads.

4. A film scanner interface comprising:
    a plurality of task digital signal processors; and
    a control digital signal processor coupled to said plurality of task digital signal processors, said control digital signal processor configured to accept a number of tasks, to distribute one or more or said tasks executable by said task digital signal processors and said control digital processor to said task digital signal processors and to perform tasks which are not distributed, said control digital signal processor comprising:
        a command interpreter that converts text string commands into an internal representation; and
        a dispatcher coupled to said command interpreter, wherein said dispatcher allocates tasks to said plurality of task digital signal processors.

* * * * *